US012626706B2

(12) United States Patent
Saund et al.

(10) Patent No.: US 12,626,706 B2
(45) Date of Patent: May 12, 2026

(54) AUTHENTICATION USING A CONVERSATIONAL USER INTERFACE

(71) Applicant: Genesee Valley Innovations, LLC, Santa Clara, CA (US)

(72) Inventors: Eric Saund, Washington, DC (US); Kyle Dent, San Carlos, CA (US); John T. Maxwell, III, Santa Clara, CA (US); Jesse Vig, Los Altos, CA (US); Daniel G. Bobrow, Palo Alto, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 177 days.

(21) Appl. No.: 17/216,037

(22) Filed: Mar. 29, 2021

(65) Prior Publication Data

US 2022/0310100 A1     Sep. 29, 2022

(51) Int. Cl.
*G06F 21/32* (2013.01)
*G10L 17/24* (2013.01)

(52) U.S. Cl.
CPC .............. *G10L 17/24* (2013.01); *G06F 21/32* (2013.01)

(58) Field of Classification Search
CPC ................................. G10L 17/24; G06F 21/32
See application file for complete search history.

(56) References Cited

U.S. PATENT DOCUMENTS

| | | | |
|---|---|---|---|
| 7,415,537 | B1 | 8/2008 | Maes |
| 7,805,309 | B2 | 9/2010 | Carpenter |
| 8,903,711 | B2 | 12/2014 | Lundberg et al. |
| 9,521,806 | B2 | 12/2016 | Takahara et al. |
| 10,592,611 | B2 | 3/2020 | Vig et al. |
| 10,693,872 | B1 * | 6/2020 | Larson .................. H04L 9/3231 |
| 10,817,667 | B2 | 10/2020 | Yi et al. |
| 2006/0195320 | A1 | 8/2006 | Carpenter |
| 2009/0187467 | A1 | 7/2009 | Fang et al. |
| 2010/0235167 | A1 | 9/2010 | Bourdon |
| 2011/0029311 | A1 | 2/2011 | Minamino et al. |
| 2012/0303829 | A1 * | 11/2012 | LaFrance .............. B60L 53/665 709/229 |
| 2016/0292408 | A1 * | 10/2016 | Zhang ..................... G06F 21/32 |
| 2017/0267251 | A1 | 9/2017 | Roberts et al. |
| 2017/0337177 | A1 | 11/2017 | Maxwell, III et al. |
| 2018/0113854 | A1 | 4/2018 | Vig et al. |
| 2018/0240463 | A1 * | 8/2018 | Perotti ................... G10L 17/22 |
| 2019/0147029 | A1 | 5/2019 | Chiu et al. |
| 2019/0243899 | A1 | 8/2019 | Yi et al. |

(Continued)

*Primary Examiner* — Towfiq Elahi

(74) *Attorney, Agent, or Firm* — Mueting Raasch Group

(57) ABSTRACT

A one-time passphrase is transmitted from an authentication system to a personal communication device of a user. The one-time passphrase includes common but incongruous words. The user is prompted to verbalize the one-time passphrase to a processor-implemented, conversational user interface. Utterances from the user are received by a conversational user interface, and the utterances are communicated from the conversational user interface to the authentication system via a trusted communication channel. The authentication system determines, using speech recognition, presence or non-presence of the one-time passphrase within the received utterances. The authentication system authenticates the user in response to detecting presence of the one-time passphrase within the received utterances.

17 Claims, 5 Drawing Sheets

(56)          References Cited

U.S. PATENT DOCUMENTS

2019/0362064 A1*  11/2019  Zhang ..................... G06F 21/35
2020/0159903 A1*   5/2020  Peter ...................... H04L 63/083
2020/0258077 A1    8/2020  Wyllie et al.
2021/0216618 A1*   7/2021  Krejci ..................... G06F 21/40
2022/0215378 A1*   7/2022  Dhama ................ G07C 5/0816

* cited by examiner

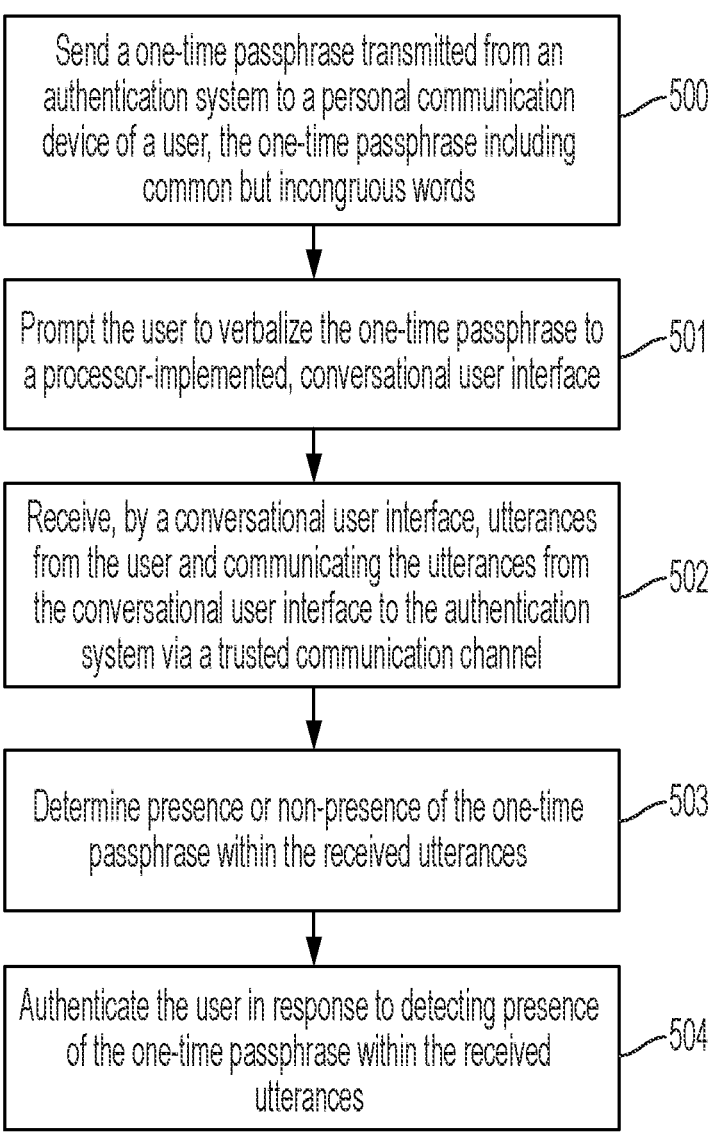

Send a one-time passphrase transmitted from an authentication system to a personal communication device of a user, the one-time passphrase including common but incongruous words — 500

Prompt the user to verbalize the one-time passphrase to a processor-implemented, conversational user interface — 501

Receive, by a conversational user interface, utterances from the user and communicating the utterances from the conversational user interface to the authentication system via a trusted communication channel — 502

Determine presence or non-presence of the one-time passphrase within the received utterances — 503

Authenticate the user in response to detecting presence of the one-time passphrase within the received utterances — 504

FIG. 5

AUTHENTICATION USING A CONVERSATIONAL USER INTERFACE

SUMMARY

The present disclosure is directed to authentication using a conversational user interface. In one embodiment, a system and method involve sending a one-time passphrase transmitted from an authentication system to a personal communication device of a user. The one-time passphrase includes common but incongruous words. The user is prompted to verbalize the one-time passphrase to a processor-implemented, conversational user interface. Utterances from the user are received by a conversational user interface, and the utterances are communicated from the conversational user interface to the authentication system via a trusted communication channel. The authentication system determines, using speech recognition, the presence or non-presence of the one-time passphrase within the received utterances. The authentication system authenticates the user in response to detecting the presence of the one-time passphrase within the received utterances.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 5 is a flowchart of a method according to an example embodiment.

DETAILED DESCRIPTION

Figure 1:
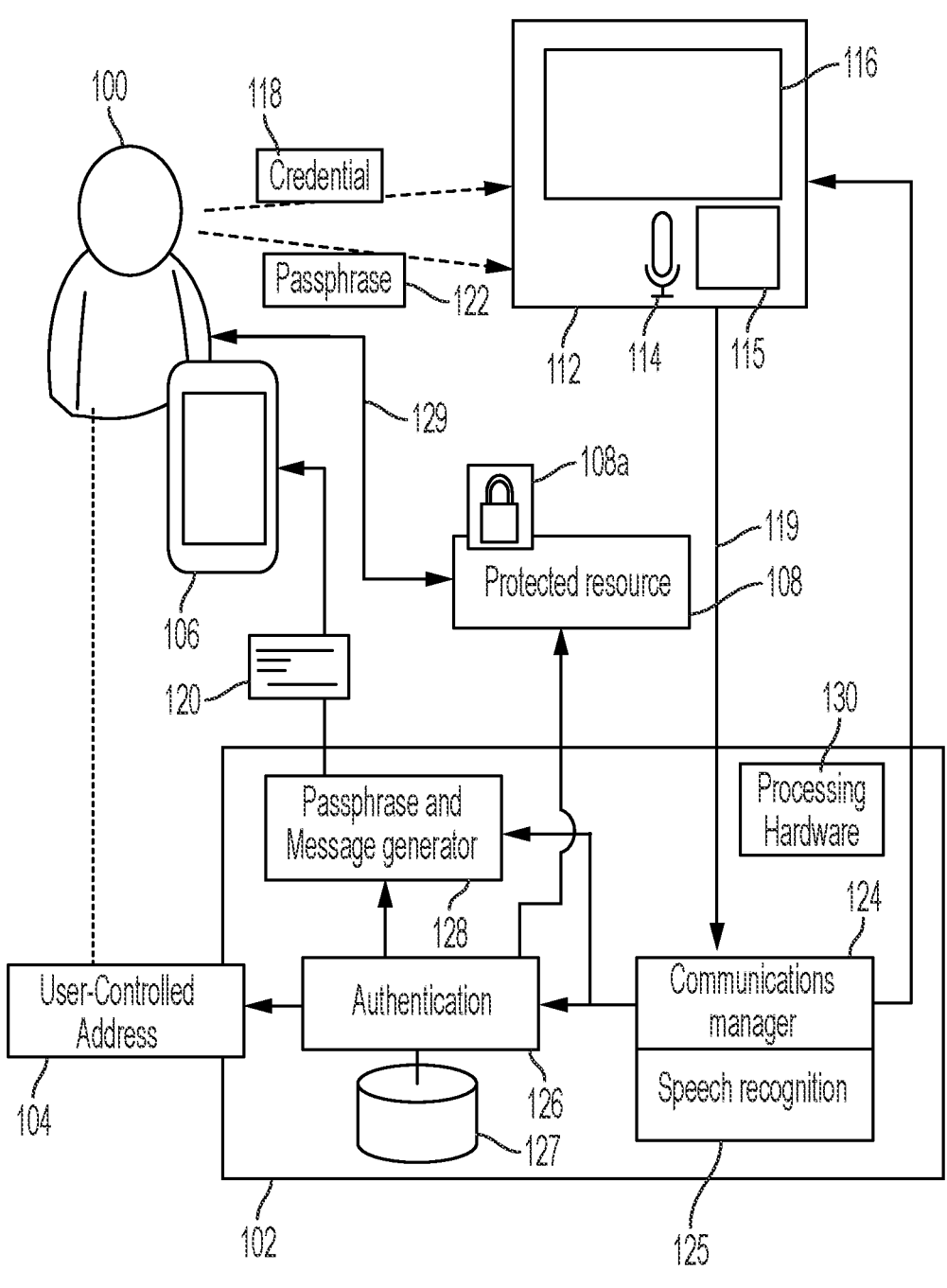
FIG. 1 is a diagram of a system according to an example embodiment.

The present disclosure is generally related to user authentication for access to computing resources. The concept of access authentication far predates modern computers. In human history, it has been common for different individuals to be permitted different access rights to protected resources, which often was access to a particular physical location, e.g., building or room, which contained valuable objects, important people, etc. Access to these physical places may be gated through the use of known-person verification, physical keys, secret passcodes, etc. For example, those wishing to enter an area would be challenged to supply a password that was distributed throughout an organization, and guards would only allow those who could say the password to pass.

In modern computer systems, a person of authority in an organization (e.g., a systems administrator) distributes secret passwords to individuals in the organization. Access to computer-based resources can be gated through the use of these secret passwords, which are entered using keyboard, keypad, or touchscreen. Often, in order to prevent onlookers from obtaining the password by reading the screen, the characters of a typed password are not displayed. Still, it is possible for unauthorized parties to obtain a secret password by observing keystrokes.

To guard against passwords being observed by unauthorized parties, some systems use one-time passwords. One way of informing the intended user of a one-time password is to have the system send the password to their personal device, as a call-back message. When combined with an initial input of a long-term password, this is known as two-step authentication.

Increasingly, automatic speech recognition enables users to interact with computer systems through spoken utterances. When seeking access to protected resources, it is undesirable for the user to speak a long-term secret password aloud because it could easily be heard and taken by others. However, the concept of verbal authentication is desirable, as it convenient and comes naturally to most users. Therefore systems and methods are described below that can provide a secure means of user identification that can be performed through open speech acts.

Currently, access to protected resources in computer systems is gated in a number of ways. For example, a login session may be established, with establishment and termination of authentication provided by one or more of the following: a long-term password entered via keystrokes at a keyboard; a long-term password entered via alphanumeric button presses on a touchpad; a long-term password entered via alphanumeric button presses on a touchscreen; biometric measurements such as iris scanning, fingerprints, and voiceprints; and two-step authentication. For two-step authentication, a long-term password is entered on a keyboard or other manual process involving a screen or physical input device. This is followed by the system sending a one-time use password to the intended user's device, which is assumed to be under the control of the correct user. The user then enters this one-time password manually using the keyboard or similar physical input device.

When the user is finished accessing protected resources, they perform a logout operation. If the user does not perform any operation under a login session for a given period of time (the timeout time), then the system may automatically exit the login session and log out the user. Systems are sometimes designed to require the user to enter their long-term secret password or two-step authorization again at times that they intend to access additional protected resources or perform protected operations. This prevents unauthorized users from taking advantage of a situation where an authorized user has physically left a device while it is in authenticated login session.

In embodiments described below, steps similar to two-step authentication are performed, while adding a conversational feature. As with most authentication systems, a setup procedure initializes the data needed for subsequent authentications. At setup time, which is prior to normal or standard usage, the user and system establish access rights and authentication prerequisites for that user. The authorized access rights define the protected resources the user will be granted access to on a normal-usage basis, when their identity is verified per use. The authentication prerequisites may include a user-controlled address such as a telephone number, email address, where the system can send a message that is reasonably assured of being received only by that user.

After the setup procedure is complete, the system can authenticate the user to access a protected resource, e.g., view and/or extract stored data, input data for storage, activation of an apparatus such as a lock, etc. This type of access is referred to herein as "operational usage," as the process is used in the normal course of operation when deciding whether to provide access to the protected resource. The standard usage in one embodiment involves conversational call-back authorization. In FIG. 1, a block diagram shows entities involved in conversational call-back authorization according to an example embodiment.

Shown in FIG. 1 is a user 100 who has performed a setup procedure as described above with an authentication system 102. As a result of the setup, the authentication system 102 has a stored user-controlled address 104 that is associated with the user 100. The user-controlled address 104 allows communicating with the user 100 via a personal device 106 of the user 100. Generally, the personal device 106 is a computing device, typically a mobile device but not required to be. It is assumed that the user 100 has exclusive access to at least some parts of the personal device 106, e.g., an account that cannot be accessed by others who have an account on the same device 106.

In operational usage, the user 100 requests authorization to access a protected resource 108. The protected resource 108 may include access to a data store for storage and/or retrieval, access to a physical device (e.g., unlock a door, have an object release through a vending-like mechanism), access to a computer account or service, access to a live data (e.g., camera, microphone), etc. The protected resource 108 has at least one access mechanism 108a to provide or prohibit access. The access mechanism 108a may be provided by the authentication system 102 itself, or the access mechanism 108a may at least trust the authentication system 102.

In this example, the user 100 requests access to the protected resource 108 through spoken natural language communication. This is performed via a conversational user interface 112, which at least has a microphone 114 or similar audio sensor. The conversational interface 112 also has a processor 115 that is able to digitize and process the audio signals, either locally or via a network service. The conversational user interface 112 may include other features such as a touchscreen display 116, however this is optional. Note that the conversational user interface 112 may be included in the personal device 106 in some embodiments.

As a first part of accessing the protected resource, the user 100 communicates her name, identifier, or other open credential 118 that ostensibly should grant her access. The open credential 118 may be received via the microphone 114 and converted to a machine readable sequence (e.g., text string) via voice recognition algorithms, which can be sent to the authentication system 102. The open credential 118 may also be obtained in other ways, such as facial recognition, fingerprint, hardware token, text entry, etc. The open credential 118 identifies the user's data in the authentication system 102 such that the user-controlled address 104 can be retrieved.

Upon retrieval of the user-controlled address 104, authentication system 102 sends a private message 120 to the user 100 containing a one-time use password/passphrase. In one embodiment, the one-time use password may be an obscure and difficult-to-guess natural language utterance that is nonetheless easy to remember for a short time and easy to say, for example, the words, "grandfather hummingbird." This is advantageous over a sequence of numbers and/or alphabetic characters such as would be used in a typical two-step authentication protocol, but which is difficult to remember and repeat at an input device. Because the selected words are arbitrary, they can be selected from a set of words that are highly recognizable by a voice recognition system, e.g., words that are easily pronounced and detected with high confidence.

The private message 120 may communicate the password or passphrase in a number of ways. The words of the password or passphrase may be communicated by a text message, or an audio or graphical representation may be used. Generally, the audio representation may be useful for certain individuals, e.g., those with impaired eyesight. When using a graphical representation, unambiguous graphics should be used such as shapes (e.g., square, circle, star), animals (e.g., butterfly, cat), everyday objects (e.g., hammer, chair), etc. Other representations can be used, such as tactile (e.g., Braille).

The conversational interface 112 may prompt the user to say the one-time passphrase, for example, by speaking: "In order to grant your request for authorization, please say the two-word passphrase that was sent to your phone." The user 100 recites the passphrase 122 off their phone and speaks the words conversationally. The conversational user interface 112 permits embedding of the passphrase with other verbiage, for example: "The passcode is grandfather hummingbird." As noted above, the authentication system 102 (or some other entity) converts the spoken utterances to computer-readable symbols via speech recognition, and the symbols can be used for comparison with the original passphrase sent to the user via message 120. The user's spoken utterances may be combined with prosodic features and ambient sounds, the latter which may or may not be generated by the user 100. The speech recognition is trained to recognize spoken words even in combination with the prosodic features and ambient sounds. The authentication system receives the utterances or speech-recognized-data via a trusted communications channel 119, e.g., secure shell, encrypted HTTP, etc. The authentication system 102 grants or denies access 129 depending on whether the converted passphrase is recognized as the one sent to the user 100 via message 120.

For purposes of illustration, the authentication system 102 is shown with a number of functional modules that may be involved in the transactions described above. A communications manager 124 has knowledge of the communication means used to communicate with other entities involved in the transactions, including the conversational user interface 112 and the personal device 106. The communications manager 124 may include or have access to a speech recognition module 125. An authentication module 126 manages user identities, user-controlled addresses 104, and conventional authentication data, e.g., password, biometric data, etc. The authentication module 126 may have access to and/or manage a user database 127. A passphrase and message generator 128 works together with the communications manager 124 and authentication module 126 to generate one-time passwords/passphrases, craft message 120 in an appropriate format, and send message 120 via the appropriate channel, e.g., via text message to a telephone number, via an Internet messaging and/or social media account, email, etc. The authentication system 102 may operate on one or more computers, as indicated by processing hardware 130, which may include central processing units, co-processors, volatile and non-volatile memory, input-output circuitry, etc.

Figure 2:
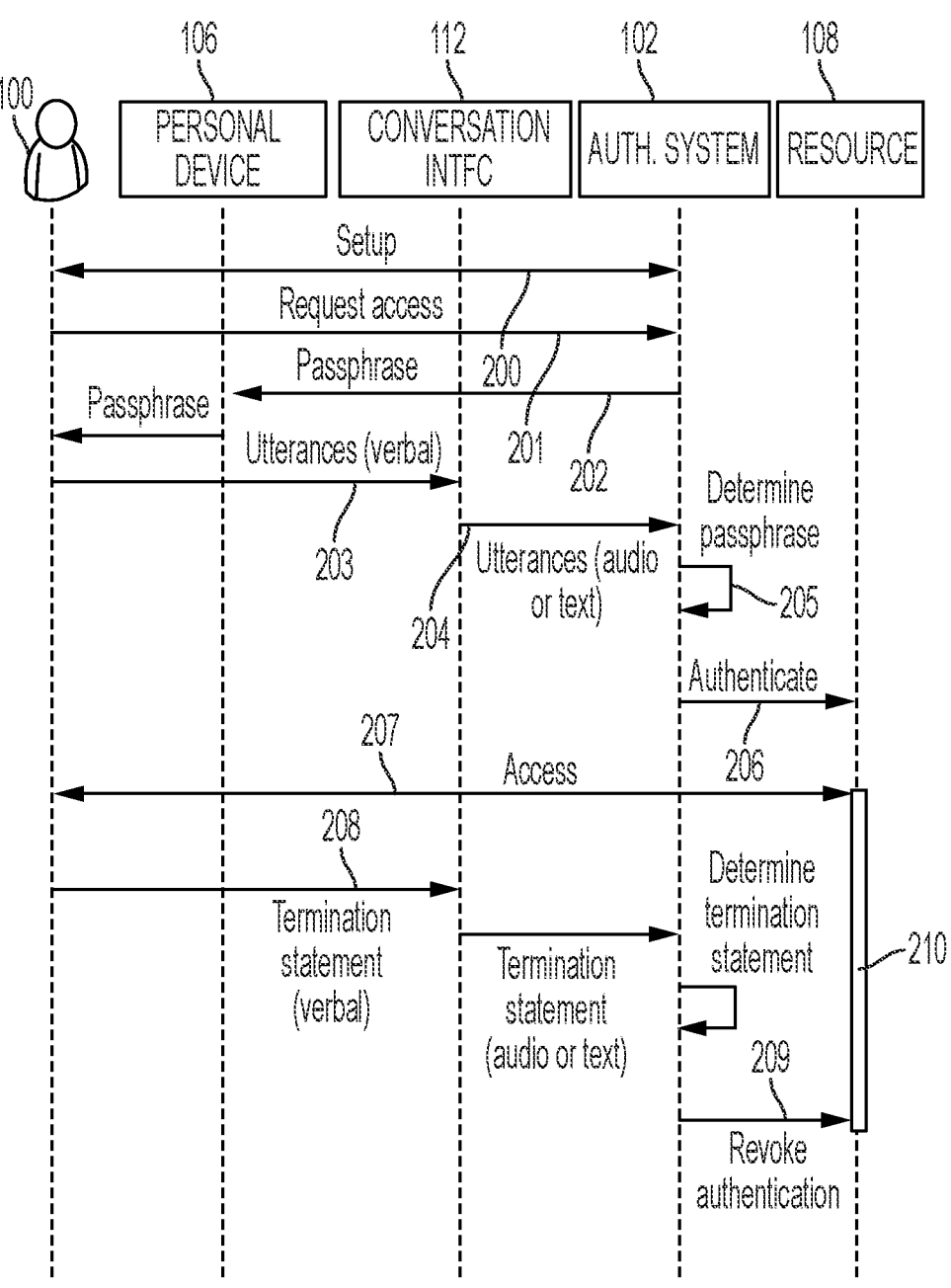
FIGS. 2-4 are sequence diagrams of methods according to example embodiments.

In FIG. 2, a sequence diagram illustrates a method according to an example embodiment. A setup procedure 200 between the user 100 and authentication system 102 is performed as described above in relation to FIG. 1. This setup procedure 200 may be performed via the personal device 106 or using another computing device, e.g., a home computer. The user 100 requests 201 access to the protected resource 108 via the authentication system 102. The request 201 may be made by an intermediary device such as the personal device 106 or the conversational interface 112, and then passed to the authentication system 102. A one-time passphrase 202 is transmitted from the authentication system to the personal communication device 106 of the user. The one-time passphrase 202 comprises common but incongruous words.

The passphrase 202 is communicated from the personal communication device 106 to the user 100, prompting the user 100 to verbalize the one-time passphrase to the processor-implemented, conversational user interface 112 as utterances 203. The conversational user interface receives the utterances 203 from the user 100 and communicates the utterances 204 from the conversational user interface 112 to the authentication system 102, e.g., via a trusted communication channel. The utterances 204 may be sent as an audio signal (digital or analog) and/or text as determined via speech recognition. If the former, the authentication system 102 can initiate its own speech recognition to convert the utterances to text or other computer-readable symbols.

The authentication system 102 determines 205 the presence or non-presence of the one-time passphrase within the received utterances that include the passphrase. The authentication system authenticates 206 the user in response to detecting 205 presence of the one-time passphrase within the received utterances 204. This provides the user 100 with access 207 to the protected resource 108, which may include any types of interactions described above.

Once conversational call-back authorization has been achieved for one transaction involving the protected resource 108, the user 100 may wish to continue to access the protected resource for an extended session 210. In one embodiment, the authorized user 100 can terminate protected access authorization by uttering a termination statement 208 such as "stop my authorization," "sign out," "end session," etc. This is passed to the authentication system 102, which revokes 209 the authentication 209, thereby terminating the session 210.

The system should guard against the authorized user 100 unintentionally walking away and leaving the system in the state of granted protected access, which could be taken advantage of by lurking unauthorized users. In order to maintain continuity of belief that the intended user 100 is still present, the system monitors other cues about their presence. These cues can include audio features of the user's speaking voice including acoustic fingerprint, speech cadence and prosody, voice localization, and video imagery.

Figure 3:
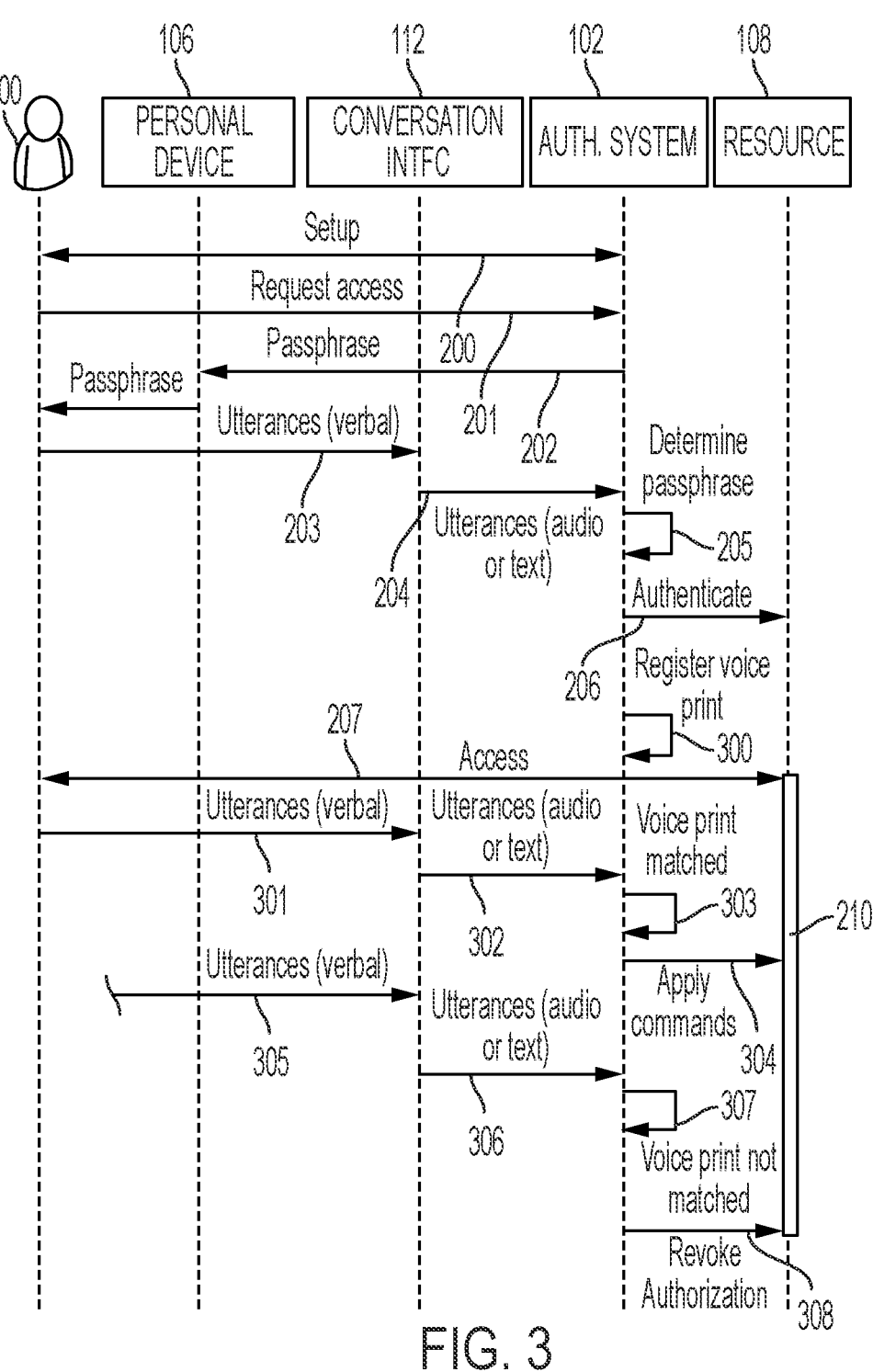

In FIG. 3, a sequence diagram shows how audio cues can be used to maintain the integrity of a session according to an example embodiment. In this figure, the authentication proceeds from operations 201-206 as described in relation to FIG. 2. In this embodiment, the user 100 achieves conversational call-back authorization 206 by speaking a one-time passphrase, their initial audio voiceprint is registered 300. Thereafter in the session 210, as long as interaction is maintained by a user with subsequent matching audio voiceprint, restricted access rights are maintained, as indicated by verbal commands 301, 302 that are applied 304 after the voice print is matched 303. This may be considered functionally equivalent to re-authenticating the user 100. If, however, protected resources or operations are attempted by a voice (e.g., utterances 305, 306) that does not match 307 the audio voiceprint, then restricted access rights are revoked 308 and the session 210 is terminated. Note that the matching of initial voiceprint and subsequent voiceprint may occur within some level of confidence, e.g., 90%, 95%, etc. A mismatch may occur if the matching is below this threshold. Note that the voiceprints may be registered based on utterances that are received along with prosodic features and existing ambient sounds, which may affect the level of confidence in some cases. The voiceprint matching can use a variable threshold in view of this unpredictable environment. For example, a lower confidence level may be allowable where a high level of noise or other non-speech information is present in at least one of the voiceprints.

Figure 4:
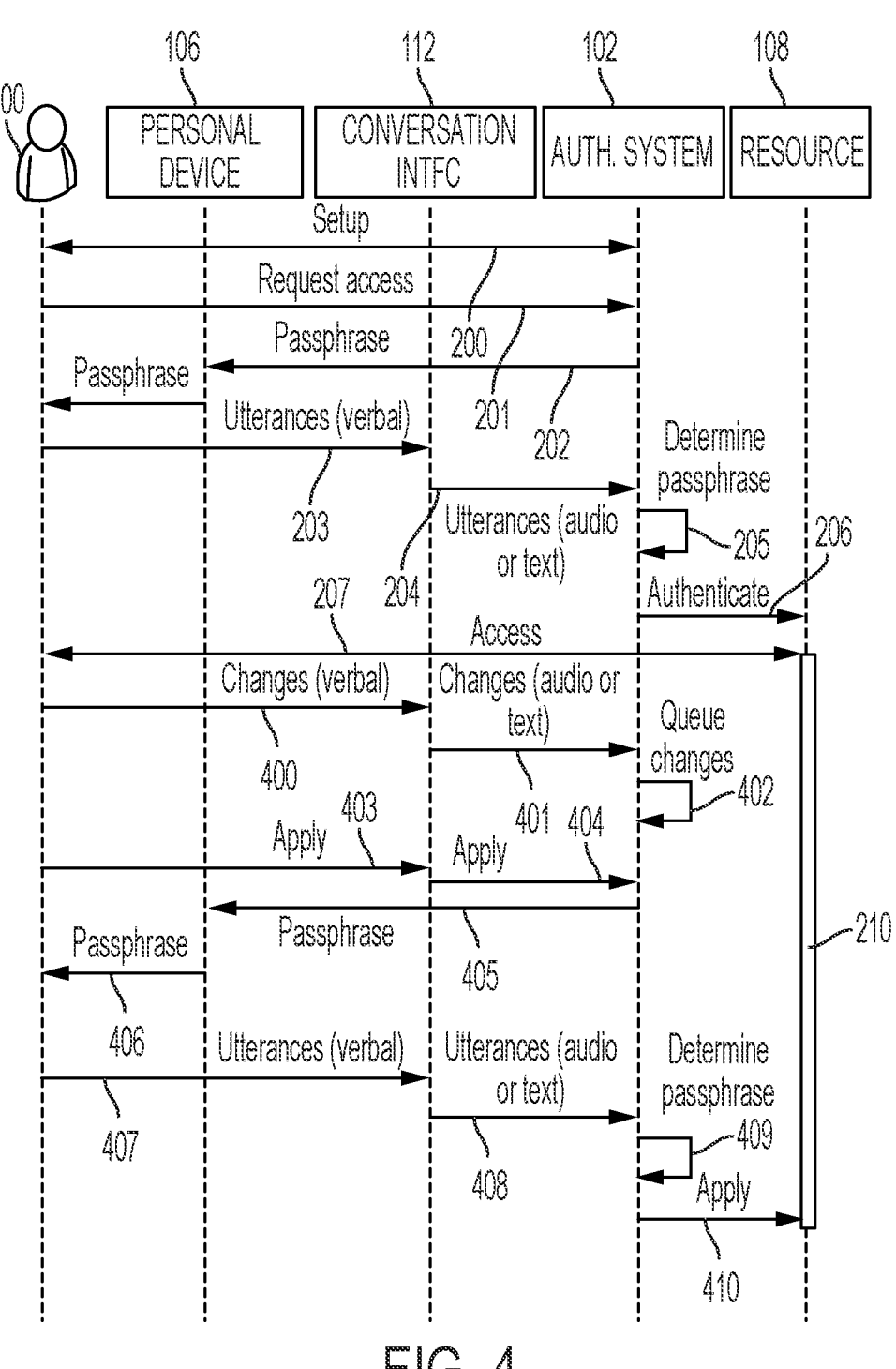

In some situations, restricted access rights enable authorized users to make changes to system data or configurations. For example, in a conversational interface to a database of employee data, an authorized user may change one or more employees' organizational membership through relatively casual verbal commands. In some embodiments, an additional safeguard is provided to ensure such changes are not made accidentally. An example of additional authorizations under an example scenario is shown in the sequence diagram of FIG. 4.

In this figure, the authentication proceeds from operations 201-207 as described in relation to FIG. 2, and the session 210 is established. During the session 210, multiple change commands 400, 401 may be made under the usage method shown in FIG. 3 (omitted here for brevity), which involves a voiceprint or related sensory signal match to validate the change commands 400, 401. A change command can be any action instruction that causes a change in state of a protected resource, analogous to an HTTP POST, SQL INSERT, etc. However, changes are kept in a "pending" status as indicated by queuing operation 402. Then, to actually execute the changes, the user will signal 403, 404 application of the changes, which may be verbal or non-verbal (e.g., press an "Apply Changes" button on a touchscreen). The system will perform conversational call-back authorization via steps 405-409 before applying 410 the changes and concluding the session.

In FIG. 5, a flowchart shows a method according to an example embodiment. The method involves sending 500 a one-time passphrase transmitted from an authentication system to a personal communication device of a user. The one-time passphrase includes common but incongruous words. The user is prompted 501 to verbalize the one-time passphrase to a processor-implemented, conversational user interface. The conversational user interface receives utterances from the user and communicates the utterances from the conversational user interface to the authentication system via a trusted communication channel. The authentication system determines 503, using speech recognition, presence or non-presence of the one-time passphrase within the received utterances. The authentication system authenticates 504 the user in response to detecting the presence of the one-time passphrase within the received utterances.

In summary, a system and method can provide secure access to a protected resource. Data input interaction with a physical input/interface device such as a keyboard or keypad is not required in order for authorized users to gain restricted access. Interaction with a physical input device may involve just reading a casual passphrase. Restricted access can be granted only to authorized users even when others are within earshot and vision, and can hear the interaction including the one-time-use passphrase.

The various embodiments described above may be implemented using circuitry, firmware, and/or software modules that interact to provide particular results. One skilled in the art can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A method comprising:
receiving an open credential from a user;
determining, based on the open credential, an address of a personal communication device of the user;
sending a one-time passphrase transmitted from an authentication system to the address of the personal communication device;
prompting the user to verbalize the one-time passphrase via utterances to a processor-implemented, conversational user interface;
determining, by the authentication system using speech recognition, presence or non-presence of the one-time passphrase within the utterances;
in response to detecting the presence of the one-time passphrase within the utterances, authenticating the user to a session; and
during the session, re-authenticating the user by:
prompting the user to provide subsequent utterances, which include a subsequent one-time passphrase different from the one-time passphrase; and
determining presence or non-presence of the subsequent one-time passphrase within the subsequent utterances.

2. The method of claim 1, wherein the personal communication device communicates the one-time passphrase to the user via a non-textual, graphical representation of common but incongruous words.

3. The method of claim 1, wherein the session provides the user access to a protected resource, wherein the re-authenticating further comprises:
determining an initial voiceprint of the user based on the utterance;
determining subsequent voiceprints of the user based on the subsequent utterances;
determining a match between the subsequent and initial voiceprints exceeding a predetermined confidence threshold; and
revoking access rights of the user to the protected resources in response to a mismatch between the subsequent and initial voiceprints.

4. The method of claim 1, further comprising receiving via the conversational user interface, a command from the user to terminate the session.

5. The method of claim 1, further comprising, during the session:
storing change commands involving protected resources in response to verbal input by the user;
and executing the stored change commands in response to the re-authenticating of the user.

6. The method of claim 1, wherein the utterances from the user include common but incongruous words that are selected to be easily pronounced and detected with high confidence by a voice recognition system.

7. The method of claim 1, wherein the utterances from the user include common but incongruous words embedded with other conversational verbiage generated by the user.

8. The method of claim 1, wherein the personal communication device communicates the one-time passphrase to the user via a tactile representation of common but incongruous words.

9. The method of claim 1, wherein the open credential is received via the conversational user interface.

10. A method comprising:
receiving an open credential from a user;
determining, based on the open credential, an address of a personal communication device of the user;
sending a one-time passphrase transmitted from an authentication system to the address of the personal communication device, the one-time passphrase comprising common but incongruous words;
prompting the user to verbalize the one-time passphrase to a processor-implemented, conversational user interface;
receiving, by the conversational user interface, utterances from the user and communicating the utterances from the conversational user interface to the authentication system via a trusted communication channel;
determining, by the authentication system using speech recognition, the presence or non-presence of the one-time passphrase within the received utterances;
authenticating, by the authentication system, the user in response to detecting the presence of the one-time passphrase within the received utterances;
after authenticating the user, storing change commands involving protected resources in response to verbal input by the user;
prior to executing the stored change commands:
prompting the user to verbalize a second one-time passphrase to the conversational user interface via the personal communication device;
determining, by the authentication system using speech recognition, presence or non-presence of the second one-time passphrase within second utterances communicated from the conversational user interface to the authentication system; and
re-authenticating the user in response to detecting presence of the second one-time passphrase within the second utterances; and
executing the stored change commands in response to successfully re-authenticating the user.

11. A system comprising:
an authentication system operable to:
receive an open credential from a user of the system;
determine, based on the open credential, an address of a personal communication device of the user;
transmit a one-time passphrase to the address of the personal communication device, the personal communication device prompting the user to verbalize the one-time passphrase; and a processor-implemented, conversational user interface operable to:

receive utterances from the user in response to the prompting; and communicate the received utterances to the authentication system;

wherein the authentication system is operable to:

determine, using speech recognition, presence or non-presence of the one-time passphrase within the received utterances;

authenticate the user to a session in response to detecting presence of the one-time passphrase within the received utterances; and during the session, re-authenticate the user by:

prompting the user to provide subsequent utterances, which include a subsequent one-time passphrase different from the one-time passphrase; and determining presence or non-presence of the subsequent one-time passphrase within the subsequent utterances.

12. The system of claim 11, wherein the personal communication device communicates the one-time passphrase to the user via a non-textual, graphical representation of common but incongruous words.

13. The system of claim 11, wherein the session provides the user access to a protected resource and, wherein the re-authenticating further comprises:

determining initial voiceprints of the user based on the utterances;

determining subsequent voiceprints of the user based on the subsequent utterances;

determining a match between the subsequent and initial voiceprints exceeding a predetermined threshold; and revoking access rights of the user to the protected resource in response to a mismatch between the subsequent and initial voiceprints.

14. The system of claim 11, wherein the system is further operable to receive a command from the user via the conversational user interface to terminate the session.

15. The system of claim 11, wherein the utterances from the user include common but incongruous words that are selected to be easily pronounced and detected with high confidence by a voice recognition system.

16. The system of claim 11, wherein the utterances from the user include common but incongruous words embedded with other conversational verbiage generated by the user.

17. The system of claim 11, wherein the personal communication device communicates the one-time passphrase to the user via a tactile representation of common but incongruous words.

* * * * *